(12) United States Patent
Shibutani et al.

(10) Patent No.: US 11,543,394 B2
(45) Date of Patent: Jan. 3, 2023

(54) COMBINED ANALYZER AND ANALYSIS METHOD

(71) Applicant: SHIMADZU CORPORATION, Kyoto (JP)

(72) Inventors: Ryuta Shibutani, Kyoto (JP); Kazuteru Takahashi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 70 days.

(21) Appl. No.: 17/186,356

(22) Filed: Feb. 26, 2021

(65) Prior Publication Data

US 2021/0278379 A1 Sep. 9, 2021

(30) Foreign Application Priority Data

Mar. 5, 2020 (JP) .............................. JP2020-037703

(51) Int. Cl.
*G01N 30/72* (2006.01)
*G01N 30/30* (2006.01)
*G01N 30/02* (2006.01)

(52) U.S. Cl.
CPC ......... *G01N 30/7206* (2013.01); *G01N 30/30* (2013.01); *G01N 2030/025* (2013.01)

(58) Field of Classification Search
CPC ............... G01N 30/7206; G01N 30/30; G01N 2030/025; G01N 30/12; G01N 2030/085; G01N 30/88
See application file for complete search history.

(56) References Cited

U.S. PATENT DOCUMENTS 11,320,408 B2 * 5/2022 Kinoshita ............. H01J 49/004

FOREIGN PATENT DOCUMENTS

JP       3-220447 A      9/1991
JP       H06258285 A  *  9/1994

* cited by examiner

*Primary Examiner* — Alexander A Mercado
*Assistant Examiner* — John M Royston
(74) *Attorney, Agent, or Firm* — Sughrue Mion, PLLC

(57) ABSTRACT

A combined analyzer includes a thermal analyzer, a trap, a gas chromatograph, a mass spectrometer, a first flow path to which a gas generated in the thermal analyzer is supplied, a second flow path that branches from the first flow path and is connected to the mass spectrometer, a third flow path that branches from the first flow path and is connected to the trap, a fourth flow path that connects the trap and a column included in the gas chromatograph, and a fifth flow path that connects the column and the mass spectrometer.

6 Claims, 4 Drawing Sheets

COMBINED ANALYZER AND ANALYSIS METHOD

BACKGROUND

Technical Field

The present invention relates to a combined analyzer of a thermal analyzer, a gas chromatograph, and a mass spectrometer, and an analysis method using the combined analyzer.

Description of Related Art

Provided are a combined analyzer (hereinafter referred to as a TA-MS device) of a thermal analyzer (TA) and a mass spectrometer (MS) or a combined analyzer (hereinafter referred to as a TA-GCMS device) of the thermal analyzer (TA) and a gas chromatograph/mass spectrometer (GCMS).

The thermal analyzer included in the TA-MS device acquires information as to a mass change and a differential heat of a sample during heating. The mass spectrometer included in the TA-MS device acquires information as to a mass spectrum of a gas generated from the thermal analyzer. In the TA-MS device, the gas generated from the thermal analyzer is directly analyzed in the mass spectrometer and, therefore, a time relation is maintained between the information as to the mass change and the differential heat and the information as to the mass spectrum. Thus, identification of the sample is performed in the TA-MS device.

The gas chromatograph/mass spectrometer included in the TA-GCMS device separates a gas generated from the thermal analyzer in a column and acquires information as to an MS spectrum of the gas separated in the column. While peaks of different components with a same m/z sometimes overlap each other in the mass spectrometer, the gas is allowed to pass through the column, so that these components can be separated in the TA-GCMS device. In the TA-GCMS device, however, time information as to heating in the thermal analyzer is lost in the column.

Also, a thermal decomposition reaction of the sample in the thermal analyzer has a width in a time direction and, therefore, if the generated gas is directly introduced into the column, sufficient separation is not carried out and only a broad chromatogram can be obtained. As such, a TA-GCMS device is also present in which the generated gas is trapped once, and the trapped gas is then introduced into the column all at once, so that a sharp chromatogram peak can be obtained. JP H03-220447 A describes a trap tube provided between the thermal analyzer and the gas chromatograph/mass spectrometer.

SUMMARY

As described above, the TA-MS device and the TA-GCMS device include the respective features and obtain different natures of results. Thus, in some cases, analysis results of both of the TA-MA device and the TA-GCMS device on a same sample are required. In such cases, a method is adopted in which the TA-MS device first performs an analysis of a sample, and then the TA-GCMS device performs an analysis of the same sample. However, even in a case where the TA-MS device and the TA-GCMS device use the same sample, identity of components of the generated gas sometimes cannot be kept due to distribution within the sample.

An object of the present invention is to obtain analysis results of both of mass spectrometry and gas chromatograph mass spectrometry while ensuring identity of components of a gas generated from a thermal analyzer.

An aspect of the present invention is directed to a combined analyzer including a thermal analyzer, a trap, a gas chromatograph, a mass spectrometer, a first flow path to which a gas generated in the thermal analyzer is supplied, a second flow path that branches from the first flow path and is connected to the mass spectrometer, a third flow path that branches from the first flow path and is connected to the trap, a fourth flow path that connects the trap and a column included in the gas chromatograph, and a fifth flow path that connects the column and the mass spectrometer.

Another aspect of the present invention is directed to an analysis method including a first step of heating a sample to generate a gas in a thermal analyzer, a second step of supplying the gas generated in the thermal analyzer to a mass spectrometer to perform mass spectrometry, a third step of supplying the gas generated in the thermal analyzer to a trap to trap the gas in parallel to the second step, a fourth step of supplying the gas trapped in the trap to a column of a gas chromatograph after the second step and the third step, and a fifth step of supplying the gas that flows out from the column to the mass spectrometer to perform mass spectrometry.

Other features, elements, characteristics, and advantages of the present disclosure will become more apparent from the following description of preferred embodiments of the present disclosure with reference to the attached drawings.

DETAILED DESCRIPTION

(1) Configuration of Combined Analyzer

Figure 1:
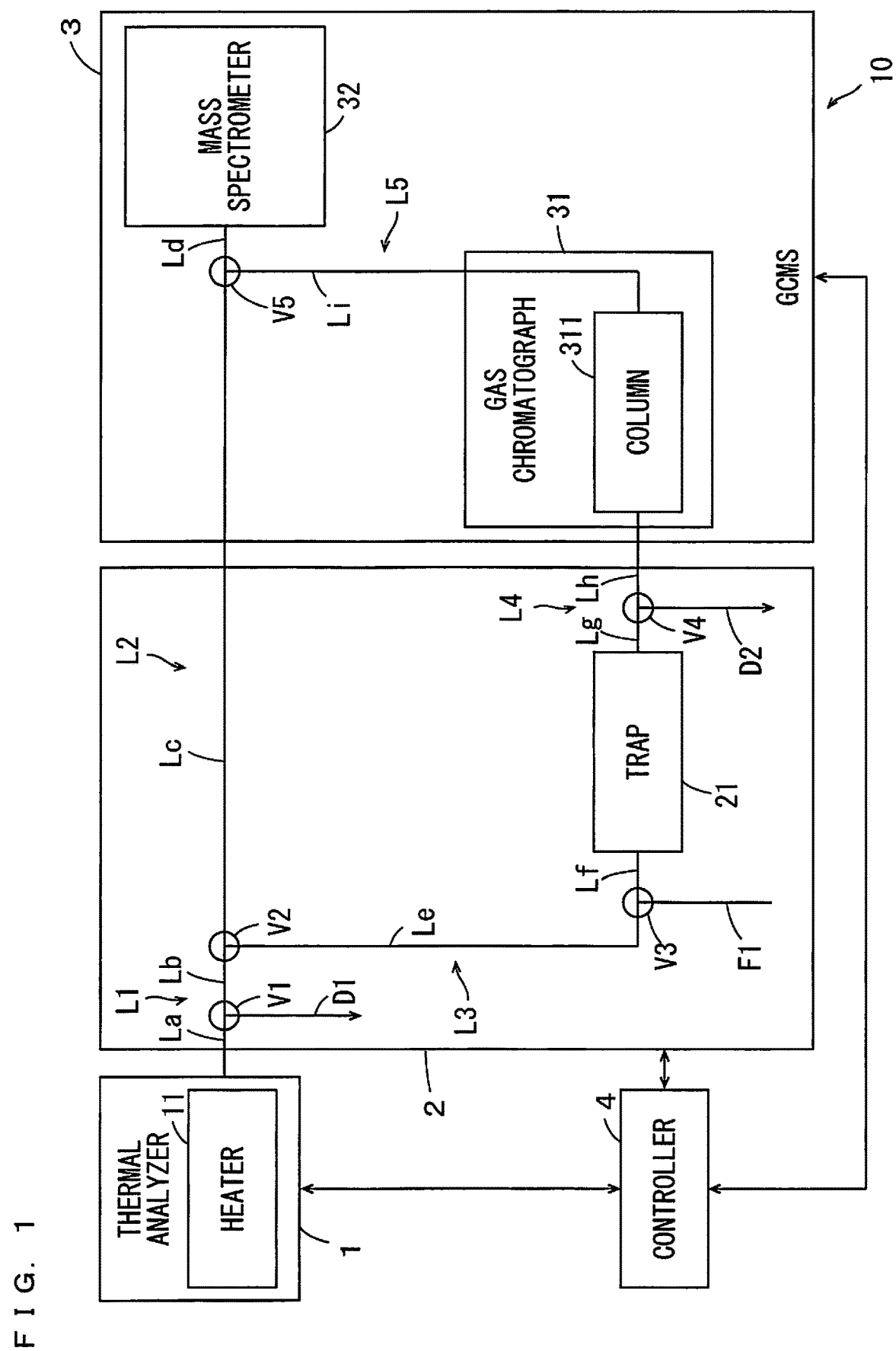
FIG. 1 is a block diagram of a combined analyzer according to an embodiment.

A combined analyzer and an analysis method according to an embodiment of the present invention will be described in detail below with reference to the attached drawing. FIG. 1 is a block diagram of a combined analyzer 10 according to the embodiment. The combined analyzer 10 includes a thermal analyzer 1, a connection device 2, a gas chromatograph/mass spectrometer 3 (hereinafter referred to as the GCMS device 3), and a controller 4.

The thermal analyzer 1 includes a heater 11 that heats a sample. The thermal analyzer 1 heats the sample using the heater 11 to acquire information as to a mass change and a differential heat of the sample. Also, the thermal analyzer 1 supplies a gas generated by heating the sample using the heater 11 to a gas flow path La. The thermal analyzer 1 includes a supplier of a carrier gas to send the gas generated from the sample to the gas flow path La using the carrier gas. In the following description, the gas generated by heating the sample is referred to as the "generated gas" to distinguish from the carrier gas. As the thermal analyzer 1, either a suspension balance thermal analyzer or a scale balance thermal analyzer may be used.

The connection device 2 is a device that connects the thermal analyzer 1 and the GCMS device 3. The connection device 2 includes a trap 21 that traps the generated gas. The connection device 2 includes gas flow paths La, Lb, Lc, Le, Lf, Lg, and Lh. The connection device 2 includes valves V1, V2, V3, and V4. The connection device 2 includes drain paths D1 and D2. The connection device 2 includes a flow gas supply path F1.

The gas flow path La extends from the thermal analyzer 1 to connect the thermal analyzer 1 and the connection device 2. The gas flow path La is connected to the valve V1 in the connection device 2. The valve V1 is connected with the gas flow paths La and Lb. Also, the valve V1 is connected with the drain path D1. The gas flow path Lb has another end connected to the valve V2. The valve V2 is connected with the gas flow paths Lb, Lc, and Le. The gas flow path Lc extends from the connection device 2 to connect the connection device 2 and the GCMS device 3. The gas flow path Lc is connected to a valve V5 in the GCMS device 3.

The gas flow path Le has another end connected to the valve V3. The valve V3 is connected with the gas flow paths Le and Lf. The valve V3 is also connected with the flow gas supply path F1. The gas flow path Lf has another end connected to the trap 21. The trap 21 traps the generated gas supplied from the gas flow path Lf. The trap 21 is, for example, a trap tube in which Tenax is filled, and adsorbs the generated gas on the Tenax. Alternatively, the trap 21 may cool the generated gas using a liquid nitrogen or a liquid carbon dioxide gas to trap the cooled gas.

The trap 21 is also connected with the gas flow path Lg. The gas flow path Lg has another end connected to the valve V4. The valve 4 is connected with the gas flow paths Lg and Lh. Also, the valve V4 is connected with the drain path D2. The gas flow path Lh extends from the connection device 2 to connect the connection device 2 and the GCMS device 3. The gas flow path Lh is connected to a column 311 in the GCMS device 3.

The GCMS device 3 includes a gas chromatograph 31 and a mass spectrometer 32. The gas chromatograph 31 includes the column 311. In the gas chromatograph 31, component separation of the generated gas is performed while the generated gas passes through the column 311. The mass spectrometer 32 performs mass spectrometry by ionizing the generated gas supplied from the gas chromatograph 31.

The GCMS device 3 also includes gas flow paths Lc, Ld, Lh, and Li. The GCMS device 3 also includes the valve V5. The gas flow path Lh extending from the connection device 2 is connected to one end of the column 311. The generated gas supplied from the gas flow path Lh is subjected to the component separation in the column 311. The gas flow path Li is connected to another end of the column 311. The generated gas subjected to the component separation in the column 311 flows into the gas flow path Li. The gas flow path Li is connected to the valve V5. The valve V5 is connected with the gas flow paths Lc, Ld, and Li. The gas flow path Ld is connected to the mass spectrometer 32.

A configuration of the mass spectrometer 32 is not specifically limited. As an ionizer of the mass spectrometer 32, an ionizer adopting electron ionization (EI), positive chemical ionization (PCI), negative chemical ionization (NCI) or the like is used. As a mass separator of the mass spectrometer 32, a quadrupole mass separator, an ion trap mass separator, a time-of-flight mass separator or the like is used. As a detector of the mass spectrometer 32, a photomultiplier tube, a secondary electron multiplier tube or the like is used.

The aforementioned gas flow paths La and Lb constitute a first flow path L1. The gas low paths Lc and Ld constitute a second flow path L2. The gas flow paths Le and Lf constitute a third flow path L3. The gas flow paths Lg and Lh constitute a fourth flow path L4. The gas flow paths Li and Ld constitute a fifth flow path L5.

The controller 4 is connected to the thermal analyzer 1, the connection device 2 and the GCMS device 3 and performs entire control of the combined analyzer 10. The controller 4 may be arranged in any one of the thermal analyzer 1, the connection device 2, and the GCMS device 3 or may be provided as a separate device.

(2) Analysis Method

Figure 2:
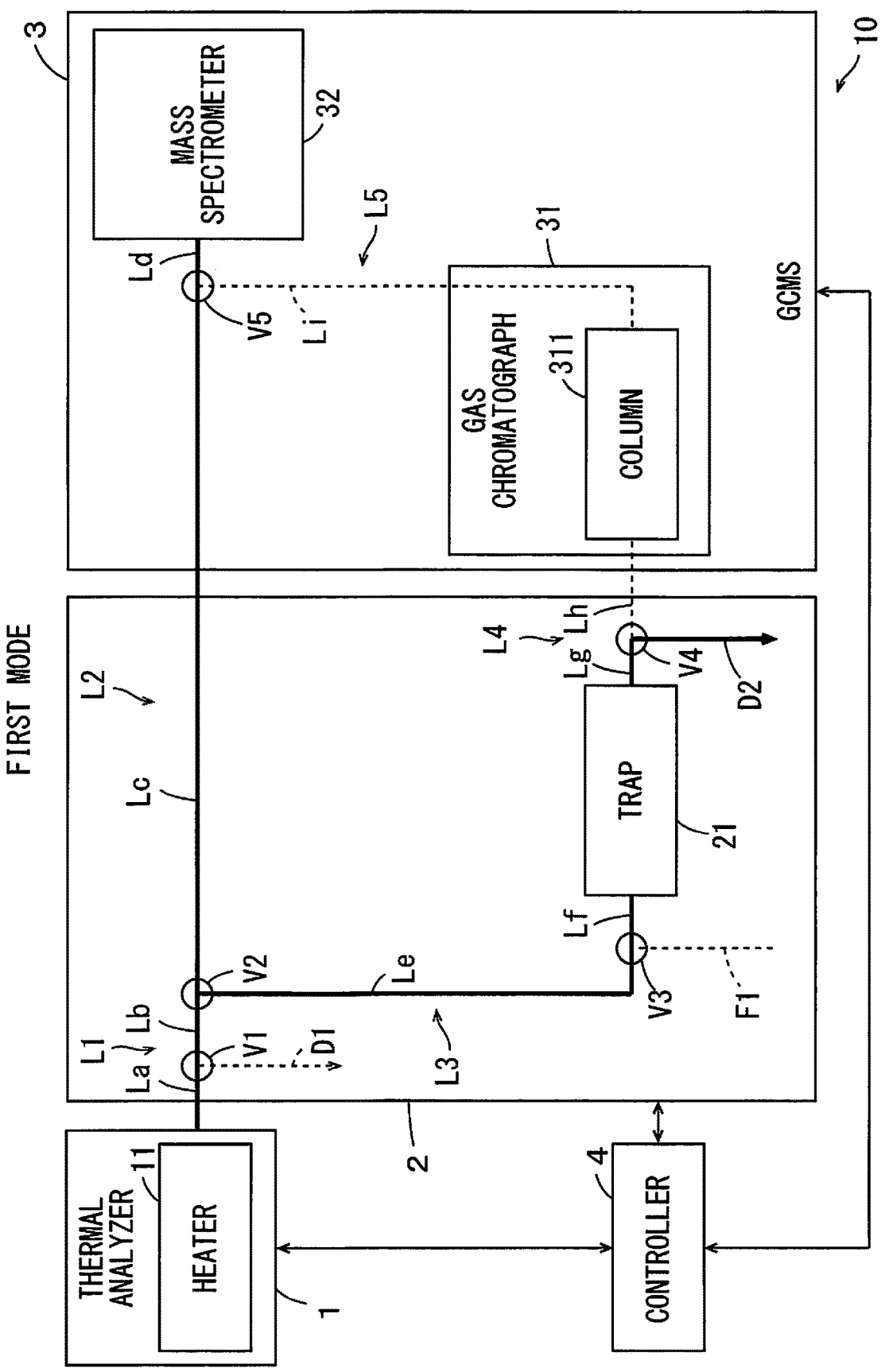
FIG. 2 is a diagram representing an operation of the combined analyzer in a first mode.
Figure 3:
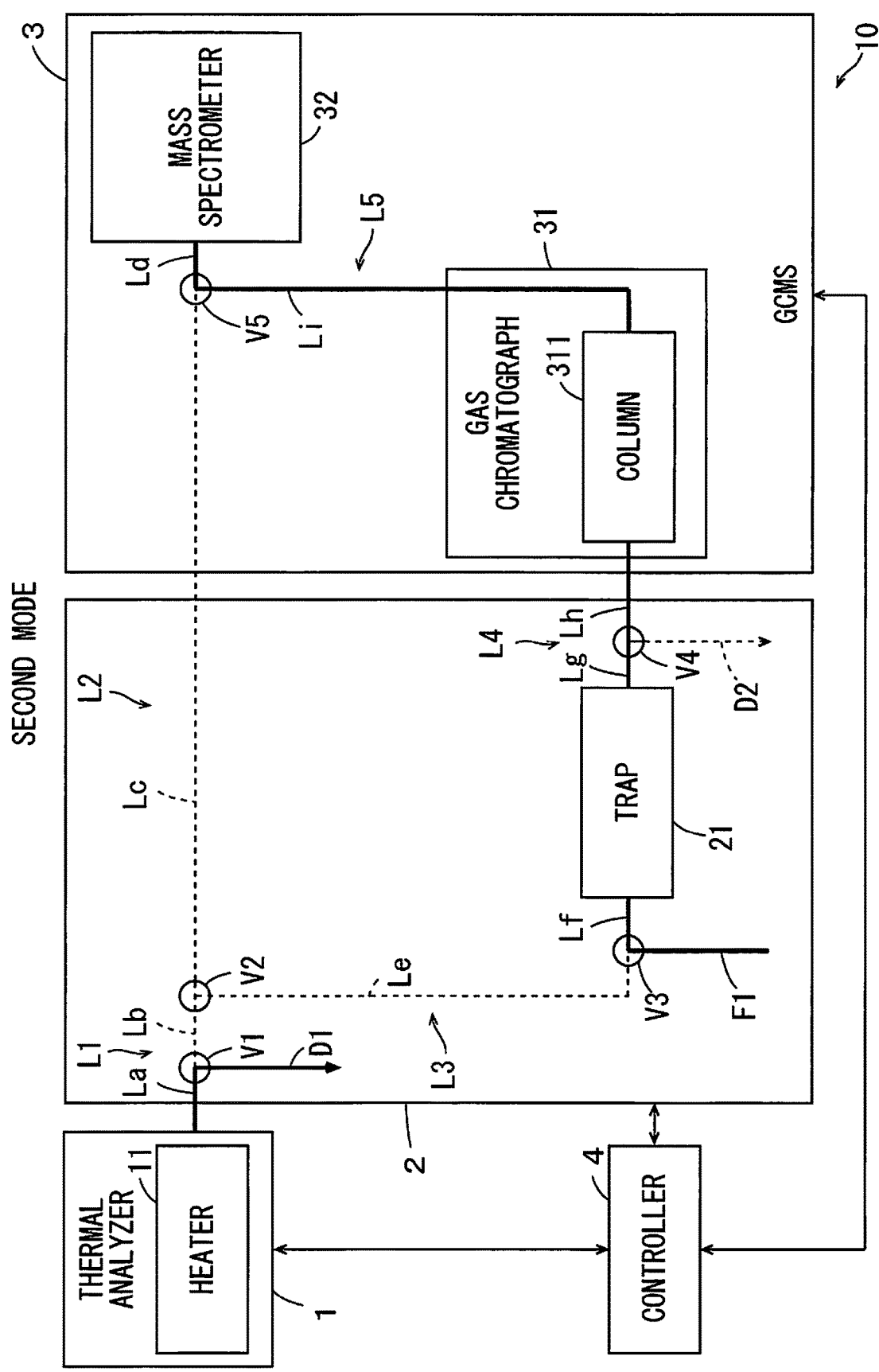
FIG. 3 is diagram representing an operation of the combined analyzer in a second mode.

An analysis method according to the embodiment will now be described with reference to FIGS. 2 and 3. FIG. 2 is a diagram showing a state where the combined analyzer 10 operates in a first mode. FIG. 3 is a diagram showing a state where the combined analyzer 10 operates in a second mode. Here, the first mode refers to a mode in which the combined analyzer 10 operates as the TA-MS device. The first mode also refers to a mode in which the combined analyzer 10 performs trapping of the generated gas in the trap 21. The second mode refers to a mode in which the combined analyzer 10 operates as the TA-GCMS device. Control of the valves V1 to V5 described below is performed by the controller 4.

In FIGS. 2 and 3, the flow paths denoted by the solid lines are flow paths that are activated by switching of the valves V1 to V5 to allow a gas to flow therethrough, and the paths denoted by the broken lines are flow paths that are blocked by switching of the valves V1 to V5 so as not to allow a gas to flow therethrough.

(2-1) First Mode

First, an operation of the combined analyzer 10 in the first mode will be described with reference to FIG. 2. The valve V1 is switched to connect the gas flow paths La and Lb. Thus, a gas generated from a sample and a carrier gas in the thermal analyzer 1 is not drained in the drain path D1 but sent to the valve V2.

The valve V2 is switched to connect the gas flow paths Lb, Lc, and Le. Thus, the generated gas and the carrier gas supplied through the gas flow path Lb are branched at the valve V2 and flow into the gas flow paths Lc and Le.

The valve V3 is switched to connect the gas flow paths Le and Lf. Thus, the generated gas and the carrier gas supplied through the gas flow path Le flow into the trap 21 via the gas flow path Lf. The flow gas supply path F1 is blocked from the gas flow paths Le and Lf at the valve V3.

The valve V4 is switched to connect the gas flow path Lg and the drain path D2. Thus, the carrier gas that has flowed out from the trap 21 is discharged into the air through the gas flow path Lg and the drain path D2. The gas flow path Lh is blocked from the gas flow path Lg and the drain path D2 at the valve V4.

The valve V5 is switched to connect the gas flow paths Lc and Ld. Thus, the generated gas and the carrier gas supplied through the gas flow path Lc flow into the mass spectrometer 32 via the gas flow path Ld. The gas flow path Li is blocked from the gas flow paths Lc and Ld at the valve V5.

In this way, in the first mode, the gas generated from the sample in the thermal analyzer 1 is supplied to the first flow path L1. The generated gas supplied to the first flow path L1 is branched at the valve V2 and then supplied to the mass spectrometer 32 through the second flow path L2. Also, in the first mode, the generated gas supplied to the first flow path L1 is branched at the valve V2 and then supplied to the trap 21 through the third flow path L3.

In the first mode, the sample is heated by the heater 11 included in the thermal analyzer 1, so that a gas is generated. In the thermal analyzer 1, information as to a mass change and a differential heat of the sample during heating up of the sample is acquired. Then, the generated gas is supplied to the mass spectrometer 32 through the first flow path L1 and the second flow path L2. Thus, a mass spectrum of the generated gas is acquired in the mass spectrometer 32. Since the generated gas passes through the first flow path L1 and the second flow path L2 and is directly supplied to the mass spectrometer 32, time information is maintained between an analysis result of the thermal analyzer 1 and an analysis result of the mass spectrometer 32. Thus, the combined analyzer 10 of this embodiment can perform identification of the sample based on the information as to the mass change and the differential heat acquired in the thermal analyzer 1 and the information as to the mass spectrum acquired in the mass spectrometer 32.

Also, in the first mode, the gas generated from the sample in the thermal analyzer 1 is supplied to the trap 21 through the first flow path L1 and the third flow path L3. Thus, the generated gas is trapped in the trap 21. That is, the operation of trapping the generated gas is performed in parallel to the operation of performing the mass spectrometry on the generated gas in the first mode.

(2-2) Second Mode

An operation of the combined analyzer 10 in the second mode will be described with reference to FIG. 3. The valve V1 is switched to connect the gas flow path La and the drain path D1. Thus, the carrier gas that flows out from the thermal analyzer 1 is discharged into the air from the drain path D1. As will be described later, in the second mode, no gas is generated from the sample and, therefore, only the carrier gas flows out from the thermal analyzer 1. The gas flow path Lb is blocked from the gas flow path La and the drain path D1 at the valve V1.

The valve V3 is switched to connect the flow gas supply path F1 and the gas flow path Lf. Thus, a flow gas supplied from the flow gas supply path F1 flows into the trap 21 via the gas flow path Lf. The gas flow path Le is blocked from the flow gas supply path F1 and the gas flow path Lf at the valve V3. The generated gas that has been trapped in the trap 21 in the first mode is desorbed from the trap 21 by the flow gas sent from the flow gas supply path F1, and is then sent to a downstream side of the trap 21.

The valve V4 is switched to connect the gas flow paths Lg and Lh. Thus, the generated gas and the flow gas that flow out from the trap 21 flow into the column 311 through the gas flow paths Lg and Lh. The drain path D2 is blocked from the gas flow paths Lg and Lh at the valve V4.

The generated gas that has flowed into the column 311 passes through the column 311 together with the flow gas that becomes a mobile phase. Then, the generated gas is separated by interaction with a stationary phase in the column 311. The generated gas separated in the column 311 flows out to the gas flow path Li.

The valve V5 is switched to connect the gas flow paths Li and Ld. Thus, the generated gas supplied through the gas flow path Li (the generated gas separated in the column 311) flows into the mass spectrometer 32 via the gas flow path Ld. The gas flow path Lc is blocked from the gas flow paths Li and Ld at the valve V5.

In this way, in the second mode, the generated gas that has been trapped in the trap 21 in the first mode is separated in the column 311. Then, in the second mode, the generated gas separated in the column 311 is supplied to the mass spectrometer 32. Thus, a mass spectrum of the generated gas, which has been generated from the sample in the thermal analyzer 1 and separated in the column 311, is acquired in the mass spectrometer 32. Thus, the combined analyzer 10 of this embodiment can serve as the TA-GCMS device in the second mode. Since the gas generated from the sample in the thermal analyzer 1 is separated in the column 311, different components with a same m/z can also be detected in a distinguished manner in the mass spectrometer 32.

The controller 4 causes the combined analyzer 10 to operate in the first mode and subsequently in the second mode. Thus, column separation and mass spectrometry are performed in the second mode on the generated gas that has been trapped in the trap 21 in the first mode. This ensures identity between components of the generated gas, which has been subjected to the mass spectrometry in the first mode and components of the generated gas, which has been subjected to the mass spectrometry in the second mode. That is, the combined analyzer 10 of this embodiment can obtain analysis results of both of the mass spectrometry and the gas chromatograph mass spectrometry while ensuring the identity of the components of the gas generated from the sample in the thermal analyzer 1.

The controller 4 controls the heater 11 of the thermal analyzer 1 to keep temperature in the thermal analyzer 1 constant during the operation in the second mode. Thus, after the gas is generated from the sample in the first mode, a new gas is prevented from being generated from the sample in the thermal analyzer 1 in the second mode. Then, when the operation in the second mode is ended, the controller 4 controls the heater 11 again to restart the heating of the thermal analyzer 1 and executes the first mode. In this way, the controller 4 repetitively executes a set of the first mode and the second mode as a mode set. Since the temperature in the thermal analyzer 1 is kept constant in the second mode, a new gas can be generated for each mode set, and the gases generated from the sample can be sequentially analyzed.

(3) Analysis Results

Figure 4:
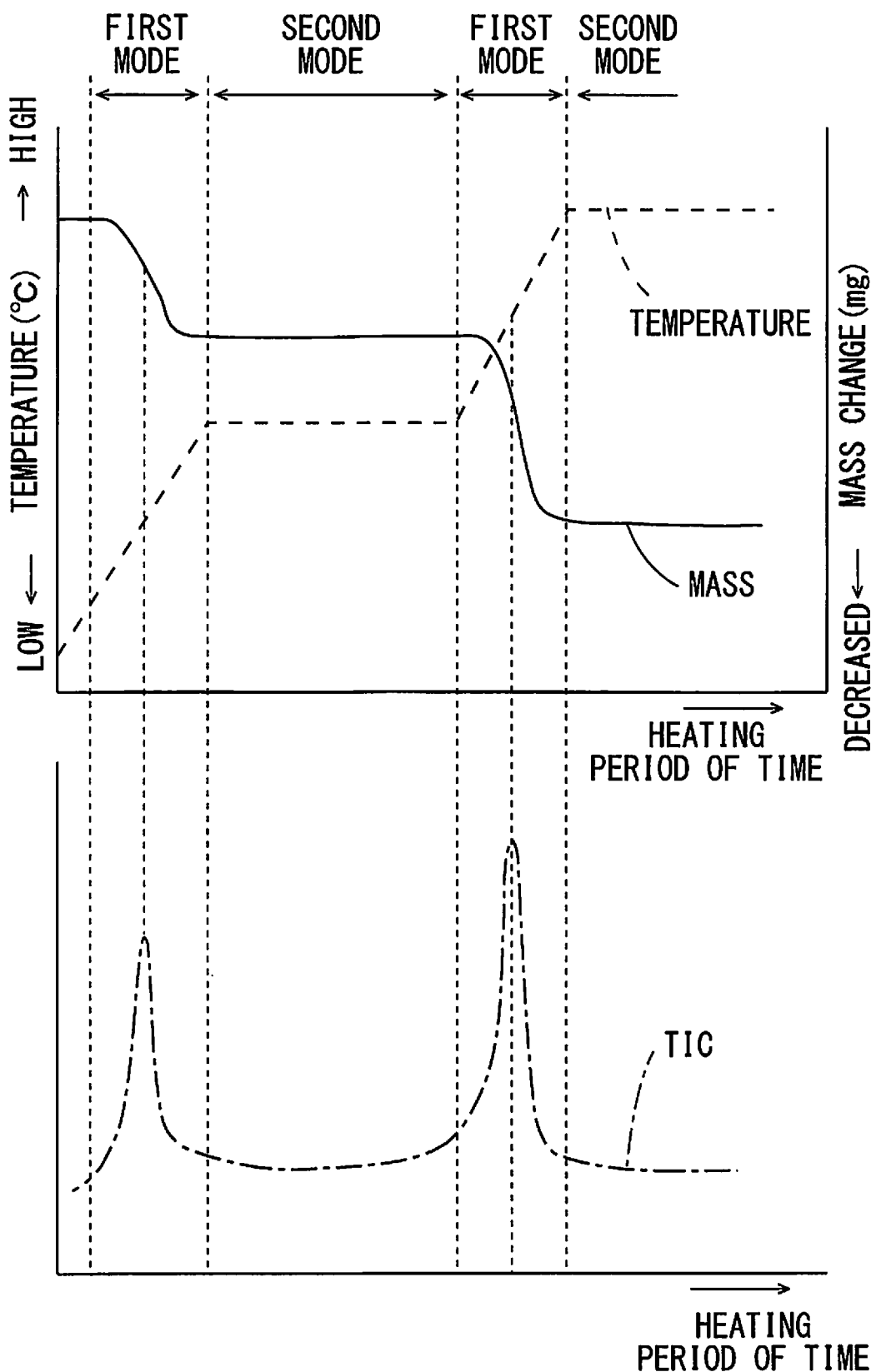
FIG. 4 is a diagram showing analysis results in the combined analyzer.

FIG. 4 is graphs showing analysis results provided by the combined analyzer 10 according to this embodiment. The upper graph of FIG. 4 is a diagram showing relationships between a heating period of time in the thermal analyzer 1 and a temperature change and a mass change of a sample. The lower graph of FIG. 4 is a total ion current (TIC) chromatogram. That is, the lower graph of FIG. 4 is a diagram showing a relationship between the heating period of time in the thermal analyzer 1 and a total value of detection intensities of all masses (m/z) acquired in the mass spectrometer 32.

As shown in the upper graph, in the first mode, the temperature of the sample is increased and the mass of the sample is decreased as the heating period of time increases. As shown in the lower graph, a peak of detection intensity is generated in the first mode. It is found that as the temperature of the sample is increased, a gas is generated from the sample and the mass of the sample is decreased in the first mode. It is also found that the gas generated from the sample is detected in the mass spectrometer 32.

As shown in the upper graph, in the second mode, the temperature in the thermal analyzer 1 is kept constant. As such, the temperature of the sample is kept constant as shown in the upper graph. Since the temperature of the sample is kept constant, no gas is generated from the sample, and hence, no mass decrease of the sample is found. It is noted that the detection intensity of the mass in the second mode is not shown in the lower graph.

As has been described above, with the combined analyzer 10 of this embodiment, it is possible to obtain the analysis results of both of the mass spectrometry and the gas chromatograph mass spectrometry while ensuring identity of the components of the gas generated from the thermal analyzer 1. Also, the combined analyzer 10 can analyze the gases sequentially generated from the thermal analyzer 1 by repetitively executing the first mode and the second mode as the mode set. Furthermore, it is possible to keep the temperature in the thermal analyzer 1 constant in the second mode. It is possible to prevent the generation of the gas in the second mode and to cause the gas to be generated only in the first mode.

(4) Other Embodiments

While the description has been made on the case where the thermal analyzer 1, the connection device 2, and the GCMS device 3 are connected to one another as the separate devices in the above-described embodiment, the configuration of the combined analyzer 10 is not limited to this. The thermal analyzer 1, the connection device 2, and the GCMS device 3 may be configured as a whole in one device. Also, as described above, the controller 4 may be accommodated in any of the devices or may be attached as a separate device.

(5) Aspects

The above-mentioned plurality of exemplary embodiments are understood as specific examples of the below-mentioned aspects by those skilled in the art.

(Item 1)

A combined analyzer according to one aspect of the present invention includes:

a thermal analyzer;
a trap;
a gas chromatograph;
a mass spectrometer;
a first flow path to which a gas generated in the thermal analyzer is supplied;
a second flow path that branches from the first flow path and is connected to the mass spectrometer;
a third flow path that branches from the first flow path and is connected to the trap;
a fourth flow path that connects the trap and a column included in the gas chromatograph; and
a fifth flow path that connects the column and the mass spectrometer.

With this combined analyzer, the gas generated from the thermal analyzer can be branched into the second flow path and the third flow path, and can be simultaneously supplied to the mass spectrometer and the trap. Also, with this combined analyzer, the gas trapped in the trap can be supplied to the mass spectrometer. Thus, it is possible to obtain analysis results of both of mass spectrometry and gas chromatograph mass spectrometry while ensuring identity of components of the gas generated from the thermal analyzer.

(Item 2)

In the combined analyzer according to the item 1, the combined analyzer may further include a controller that switches a mode between a first mode and a second mode, and, in the first mode, the controller activates a path that extends from the thermal analyzer to the mass spectrometer via the first flow path and the second flow path, to supply the gas generated from the thermal analyzer to the mass spectrometer to perform mass spectrometry, and also activates a path that extends from the thermal analyzer to the trap via the first flow path and the third flow path, to trap the gas generated from the thermal analyzer in the trap, and in the second mode, the controller activates a path that extends from the trap to the mass spectrometer via the fourth flow path and the fifth flow path, to supply the gas trapped in the trap to the mass spectrometer via the column to execute mass spectrometry.

By switching the mode between the first mode and the second mode, it is possible to obtain the analysis results of both of the mass spectrometry and the gas chromatograph mass spectrometry while ensuring the identity of the components of the gas generated from the thermal analyzer.

(Item 3)

In the combined analyzer according to the item 2, the controller may repetitively execute a mode set in which the second mode is executed subsequent to the first mode.

It is possible to perform the mass spectrometry and the gas chromatograph mass spectrometry sequentially on the gas generated from the thermal analyzer.

(Item 4)

In the combined analyzer according to the item 2 or 3, the controller may keep a heating temperature in the thermal analyzer constant during the execution of the second mode.

It is possible to prevent a gas being generated from a sample in the second mode and to cause the gas to be generated only in the first mode.

(Item 5)

An analysis method according to another aspect includes:

a first step of generating a gas by heating a sample in a thermal analyzer;
a second step of supplying the gas generated in the thermal analyzer to a mass spectrometer to perform mass spectrometry;
a third step of supplying the gas generated in the thermal analyzer to a trap to trap the gas in parallel to the second step;
a fourth step of supplying the gas trapped in the trap to a column of a gas chromatograph after the second step and the third step; and
a fifth step of supplying the gas that flows out from the column to the mass spectrometer to perform mass spectrometry.

With this analysis method, it is possible to simultaneously supply the gas generated from the thermal analyzer to the mass spectrometer and the trap by the second step and the third step. Also, with this analysis method, it is possible to supply the gas trapped in the trap to the mass spectrometer by the fourth step and the fifth step. Thus, it is possible to obtain analysis results of both of the mass spectrometry and gas chromatograph mass spectrometry while ensuring identity of components of the gas generated from the thermal analyzer.

(Item 6)

In the analysis method according to the item 5, this analysis method may repetitively perform a set of the first to fifth steps as one set step.

(Item 7)

In the analysis method according to the item 6, this analysis method may keep a heating temperature constant in the thermal analyzer while performing the fourth step and the fifth step.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A combined analyzer comprising:
a thermal analyzer;
a trap;
a gas chromatograph;
a mass spectrometer;
a first flow path to which a gas generated in the thermal analyzer is supplied;
a second flow path that branches from the first flow path and is connected to the mass spectrometer;
a third flow path that branches from the first flow path and is connected to the trap;
a fourth flow path that connects the trap and a column included in the gas chromatograph;
a fifth flow path that connects the column and the mass spectrometer; and
a controller that switches a mode between a first mode and a second mode,
wherein, in the first mode, the controller activates a path that extends from the thermal analyzer to the mass spectrometer via the first flow path and the second flow path, to supply the gas generated from the thermal analyzer to the mass spectrometer to perform mass spectrometry, and also activates a path that extends from the thermal analyzer to the trap via the first flow path and the third flow path, to trap the gas generated from the thermal analyzer in the trap, and in the second mode, the controller activates a path that extends from the trap to the mass spectrometer via the fourth flow path and the fifth flow path, to supply the gas trapped in the trap to the mass spectrometer via the column to execute mass spectrometry.

2. The combined analyzer according to claim 1, wherein the controller repetitively executes a mode set in which the second mode is executed subsequent to the first mode.

3. The combined analyzer according to claim 1, wherein the controller keeps a heating temperature in the thermal analyzer constant during the execution of the second mode.

4. An analysis method comprising:
a first step of generating a gas by heating a sample in a thermal analyzer;
a second step of supplying the gas generated in the thermal analyzer to a mass spectrometer to perform mass spectrometry;
a third step of supplying the gas generated in the thermal analyzer to a trap to trap the gas in parallel to the second step;
a fourth step of supplying the gas trapped in the trap to a column of a gas chromatograph after the second step and the third step; and
a fifth step of supplying the gas that flows out from the column to the mass spectrometer to perform mass spectrometry.

5. The analysis method according to claim 4, wherein a set of the first to fifth steps is repetitively performed as one set step.

6. The analysis method according to claim 5, wherein a heating temperature is kept constant in the thermal analyzer while the fourth step and the fifth step are performed.

* * * * *